United States Patent [19]

Hutterman et al.

[11] Patent Number: 4,977,090
[45] Date of Patent: Dec. 11, 1990

[54] PROCESS FOR THE TREATMENT OF OXYGENATED EXHAUST GASES

[76] Inventors: Aloys Hutterman, Busgenweg 2; Andrzej Majcherczyk, both of D-3400 Gottingen; Frantisek Zadrazil, D-3171 Hillerse, all of Fed. Rep. of Germany

[21] Appl. No.: 318,610

[22] Filed: Mar. 3, 1989

[30] Foreign Application Priority Data

Mar. 4, 1988 [DE] Fed. Rep. of Germany ....... 3807033

[51] Int. Cl.$^5$ .............................................. A61L 9/01
[52] U.S. Cl. .................................... 435/266; 435/262
[58] Field of Search ......................................... 435/266

[56] References Cited

FOREIGN PATENT DOCUMENTS

| | | |
|---|---|---|
| 0085757 | 8/1983 | European Pat. Off. . |
| 0100024 | 2/1984 | European Pat. Off. . |
| 0132503 | 2/1985 | European Pat. Off. . |
| 0192237 | 8/1986 | European Pat. Off. . |

OTHER PUBLICATIONS

Mueller et al.–Chem. Abst., vol. 105 (1986) p. 63610f.
Timofeeva et al.–Chem. Abst., vol. 102 (1985) p. 154309u.
Timofeeva et al.–Chem. Abst., vol. 101 (1984) p. 215808j.
Hitachi et al.–Chem. Abst., vol. 100 (1984) p. 179581y.
Anglo et al.–Chem. Abst., vol. 104 (1986).

*Primary Examiner*—Sam Rosen
*Attorney, Agent, or Firm*—Marmorek, Guttman & Rubenstein

[57] ABSTRACT

A process for the decontamination of oxygenated gases comprises growing a mycelium of pocket rot mushrooms on a substrate and bringing the exhaust gas into contact with the mycelium. The substrate comprises a waste material, such as agricultural, forestry, or fishery wastes, or wastes from the wood pulping industry. The mycelium and the substrate are shaped into body forms of a desired configuration which promote contact of the oxygenated gas with the mycelium in particular environments.

9 Claims, No Drawings

PROCESS FOR THE TREATMENT OF OXYGENATED EXHAUST GASES

REFERENCE TO RELATED APPLICATION

Reference is made to co-pending U.S application Ser. No. 246,805, filed Sept. 20, 1988, which shares a common inventor with the present application.

BACKGROUND OF THE INVENTION

The instant invention relates to a process for the decontamination of oxygen containing gases, in particular of waste gases.

To reconstruct soils which have been contaminated with such materials as polyaromates, waste materials containing hemicellulose, e.g., straw chaff, inoculated with pocket rot mushrooms have been used. In this method, the contaminated soil, e.g., in an earth benefication plant, is chopped up and is mixed homogeneously with the straw chaff which has been inoculated with the appropriate mushroom species. This mixture is layered in the usual manner and is composted and the progress of decontamination is monitored through regular analyses. Such a process is described in the German patent application No. P 37 31 816.0 and in the above-referenced U.S. application Ser. No. 246,805; filed Sept. 20, 1988. In the most favorable cases, decomposition rates of approximately 40% can be achieved with this method.

In EU-OS No. 0 192 237 a process for the decomposition of soil contaminants is described in which the soil contaminants are transformed under aerobic conditions with mushroom enzymes, e.g., those of pocket rot mushrooms containing a lignin-decomposing oxygenase and oxygenated water. The contaminants can be mixed with lignin, cellulose, old paper, wooden particles, sawdust or humus in this process.

A process for the decontamination of oxygenated gases, in particular waste gases, by means of pocket rot mushrooms has not been known previously. The possibility of removing pollutants from the air by means of micro-organisms has been regarded as limited until now, compared with the removal of pollutants from solid or liquid materials (see e.g., German Bundestag, Printed Document No. 10/6775 of Jan. 6, 1987).

It is the object of the instant invention to create a process in which the known aromate-degrading effect of pocket rot mushrooms is used for the decontamination of gases, in particular oxygenated waste gases.

SUMMARY AND DETAILED DESCRIPTION OF THE INVENTION

This object is attained in that the oxygenated waste gases are guided over body forms in the presence of water, said forms being made from land, forestry or fishery waste materials, or from wastes of the wood processing industry, which forms are grown through with mushroom mycelia of pocket rot mushrooms.

When the above-mentioned waste materials have been inoculated with pocket rot mushrooms, mushroom mycelia begin to grow through the waste materials so that connected body forms are produced. The cohesiveness of the body forms can be improved by applying a slight pressure, approximately in the order of up to 10 bar. With many waste materials such as layered straw, the connected body forms are solidified by the pressure of the layered material itself, and layer heights of up to several meters can be used. In this manner body forms can be produced directly in pipes, columns, etc., for example by putting the inoculated waste materials into the containers used and by cultivating the solidifying mycelia. It is however also possible to produce the body forms in a variety of shapes after formation of the mycelia which grow through the waste materials. Accordingly, the body forms can have the most varied configurations, such as cylindrical or disk shapes which are put directly into the pipes through which the gases to be decontaminated flow. The body forms can also be in configurations having gaps therein and placed in dumped mounds so as to promote a flow-through of the gases to be decontaminated. Such configurations can be cylindrical pipe segments, for example, so-called Raschig rings, or many-cornered bodies such as tetrahedrons, pyramids, etc., or forms with projecting portions such as tetrapodes. It will be apparent that the outer configuration of the forms can be almost of any kind and is not subject to any limitations so long as dumped mounds of the body forms have sufficient permeability. Body forms, in particular, body forms in the configuration of dumped mounds, should preferably have a minimum diameter of approximately 0.5 cm.

Straw, plant particles, wood pieces, e.g., split wood, wood chips, stump wood, etc., crawfish or crab shells, particle board waste, etc., are the preferred agricultural, forestry and fishery waste materials or wood processing wastes used. The mushroom mycelium grows through these waste materials as a support and the waste materials can furthermore serve in many cases as nutrients for the mushrooms. When the mushroom mycelium has grown through the waste materials, as generally is the case after a cultivation period of approximately 10 to 30 days, the body forms thus constituted generally have already sufficient stability to ensure their ease of manipulation. By applying slight pressure up to approximately 10 bar, this ease of manipulation can be further improved.

All pocket rot mushrooms can be used in the process according to the invention Such species as Polyporus spec., Stereum spec., Marasmius spec., Pleurotus spec. or Sprotrichum spec. are used preferably.

The process according to the invention is suitable for the decontamination of all gases containing oxygen. The oxygen contents should preferably not be less than 3% in volume in order to ensure sufficient decontamination through the aerobic pocket rot mushrooms. If the oxygen contents are insufficient, the gases to be decontaminated must be enriched with oxygen, e.g., by adding air.

In order to avoid drying out of the waste materials grown through with the mycelium, the gases to be decontaminated can be enriched with water as needed. This can be achieved through injection of water into the stream of gas to be decontaminated, e.g., up to the point of saturation.

The process according to the invention is suitable for the decontamination of all gases containing oxygen, in particular waste gases. Because of their wide spectrum of effectiveness, pocket rot mushrooms can utilize nearly all organic materials and volatile inorganic materials. The process according to the invention is therefore suitable for the decontamination of gases containing organic materials, in particular halogenated hydrocarbons, aromatic compounds, polymerizable compounds such as styrol, etc., and for volatile inorganic compounds such as sulfurated hydrogen, hydrocyanic acid and their derivatives such as cyanates, etc., ammonia, phosphorated hydrogen or nitrogen oxides.

The process according to the invention makes it possible, to degrade contaminating aromates such as styrol representing up to 99% of the total contents with one-time flow-through of a layer 200 cm thick, as compared with the degradation of merely 40% in the case of contaminated solids.

The invention is explained in greater detail below through the following examples.

EXAMPLE 1

Culture of the pocket rot mushrooms

Small quantities of mycelium (5×5 mm) were taken under sterile conditions from agar plate cultures and were transferred into 500 ml Erlenmeyer flasks containing 30 ml of a liquid-medium BSM. The liquid medium BSM is constituted as follows:

| | |
|---|---|
| 5 g | glucose |
| 0.5 g | yeast extract |
| 0.5 g | asparagine |
| 1 g | $KH_2PO_4$ |
| 0.5 g | $MgSO_4.7H_0$ |
| 0.5 g | KCl |
| 0.01 g | $FeSO_4.7H_2O$ |
| 0.008 g | $Mn(CH_3COO)_2.4H_2O$ |
| 0.002 g | $ZnNO_3$ |
| 0.05 g | $Ca(NO_3)_2.4H_2O$ |
| 0.003 g | $CuSO_4.5H_2O$ |
| | in 1000 ml distilled water. |

EXAMPLE 2

The cultures of example 1, following a good surface covering growth, were comminuted and injected onto sterilized wheat kernels.

The granulate obtained from the suspension of example 1 can also be injected onto prepared straw.

EXAMPLE 3

The cultures of example 1 were minced after having reached good growth and were inoculated into a fermenter, e.g., a Biostat U fermenter of the Braun Co., Melsungen. Approximately 30 l. of culture liquid was inoculated per charge. The inoculated culture liquid is aerated and agitated and is cultivated for four days at a constant temperature of 28° C. at a constant pH value of 5.0. The mycelium liquor is then lightly homogenized with a homogenizer, e.g., with an Ultroturrax, and is used as an inoculated suspension for the production of the form bodies.

EXAMPLE 4

Production of a substrate

1. Wood:

All hardwood and coniferous wood species are suitable for the production of mushroom-permeated body forms. Birch and poplar woods are colonized rapidly but are also degraded more rapidly by the mushrooms and have a useful life of approximately one year. Hard woods such as beech or oak are colonized more slowly but have a longer useful life of up to 2 to 3 years, approximately. Coniferous woods have an average colonization period and useful life.

a. Wood chips:

Freshly felled wood is chopped into chips by means of a known chipper, such as is used in the chemical pulp industry. The chips are heated in water-saturated air to a temperature from 60° to 80° C. for a few hours and are then cooled to a temperature of 25° C. and are inoculated with a cereal grain culture (as in example 2) or with a liquid inoculating material (as in example 3). Incubation, i.e., the growing of the mushrooms into the solid substrate takes place in a bio-reactor for solids. The incubation period is from 10 to 30 days, depending on the type of mushroom and on the wood substrate.

b. Wood particles:

Freshly felled wood is chopped up by a cutting machine such as is used to produce wood particles in the particle board industry. These are then heat-treated and inoculated as described for the wood chips.

2. Straw:

Straw is cut in a machine used in agriculture to chaff lengths of 0.5 to 5 cm. By adding water the water contents are brought to approximately 70%. The mixture is then heated for several hours to a temperature between 60° and 80° C. and is then cooled slowly and inoculated as described for wood chips.

3. Agricultural waste materials:

The waste materials are chopped up and are sieved to a grain size of approximately 0.5 to 5 cm. By adding water the water contents are brought to approximately 70%. Missing nutrients are added if necessary, and the mixture is heat-treated as in the previous examples. The cooled substrata are inoculated and incubated as described for wood chips.

EXAMPLE 5

Decontamination Test

Straw in which the mushroom Pleurotus ostreatus was grown according to example 4 was put into a column with a diameter of 5 cm and a height of 200 cm and a capacity of 3.0 liter. Contaminated air with a relative air humidity of 96% was blown through at a flow rate of 1 to 5.5 liter per minute. The reactor temperature was 24° C. Over a period of several days the following decontamination rates were obtained continuously:

Styrol, charge 1,245 $mg/m^3$ air: 99.94% decomposition.

Styrol, charge 3,000 $mg/m^3$ air: 80.00% decomposition.

The lowest styrol value is equal to ten time the value of the presently allowed maximum concentration at the work site (MAK).

Saturated spent sulfite liquor vapors: 100% decomposition.

The value is equal to ten time the value admissible after TA air.

The decomposition rate was verified by means of olfactory as well as spectroscopic measurements.

While the invention has been described by reference to specific embodiments, this was for purposes of illustration only and should not be construed to limit the spirit or scope of the invention.

We claim:

1. A process for the decontamination of a gas containing oxygen and an organic or volatile inorganic contaminant, comprising
   bringing said gas into contact with an active mycelium of pocket rot mushrooms grown on a substrate made from agricultural wastes, forestry wastes, fishery wastes, or wastes from the wood processing industry, said substrate being configured into a body form.

2. The process of claim 1 wherein said gas is a waste gas.

3. The process of claim 1 further comprising enriching said gas with moisture prior to bringing said gas into contact with said mycelium of pocket rot mushroom.

4. The process of claim 1 wherein said gas comprises at least 3% by volume of oxygen.

5. The process of claim 1 wherein said substrate is selected from the group consisting of straw, plant parts, wood pieces, wood shavings, bark parts, crawfish shells, crab shells, and particle board wastes.

6. The process of claim 1 wherein said body form has a diameter of at least 0.5 cm.

7. The process of claim 1 wherein said pocket rot mushroom is selected from the group of species consisting of: Polyporous spec., Stereum spec., Marasmius spec., Pleurotus spec., and Sporotrichum spec.

8. The process of claim 1 wherein said organic contaminant is selected from the group consisting of halogenated hydrocarbons, aromatic compounds, and polymerizable compounds.

9. The process of claim 1 wherein said volatile inorganic contaminant is selected from the group consisting of sulfurated hydrogen, hydrocyanic acid, cyanates, ammonia, phosphorated hydrogen, nitrogen oxide and derivatives thereof.

* * * * *